US009877428B2

(12) United States Patent
Moore

(10) Patent No.: US 9,877,428 B2
(45) Date of Patent: Jan. 30, 2018

(54) AGRICULTURE VEHICLES

(71) Applicant: Francis Wilson Moore, Pasco, WA (US)

(72) Inventor: Francis Wilson Moore, Pasco, WA (US)

(73) Assignee: HarvestMoore, L.L.C., Pasco, WA (US)

( * ) Notice: Subject to any disclaimer, the term of this patent is extended or adjusted under 35 U.S.C. 154(b) by 0 days.

(21) Appl. No.: 15/138,041

(22) Filed: Apr. 25, 2016

(65) Prior Publication Data

US 2016/0235006 A1    Aug. 18, 2016

Related U.S. Application Data

(60) Division of application No. 14/966,704, filed on Dec. 11, 2015, which is a division of application No. (Continued)

(51) Int. Cl.
*A01D 46/30* (2006.01)
*A01D 46/24* (2006.01)
(Continued)

(52) U.S. Cl.
CPC ............ *A01D 46/30* (2013.01); *A01B 69/008* (2013.01); *A01B 79/02* (2013.01); *A01D 34/008* (2013.01);
(Continued)

(58) Field of Classification Search
CPC combination set(s) only.
See application file for complete search history.

(56) References Cited

U.S. PATENT DOCUMENTS 2,288,682 A    7/1942 Chittenden
2,443,027 A    6/1948 Dishmaker
(Continued)

FOREIGN PATENT DOCUMENTS

WO PCT/US2010/046678    4/2011
WO PCT/US2010/046878    4/2011

OTHER PUBLICATIONS

Gorte, et al., "Structuring Laser-Scanned Trees Using 3D Mathematical Morphology", ResearchGate Conference Paper, Jan. 2004, 6 pgs.

*Primary Examiner* — Alicia Torres
(74) *Attorney, Agent, or Firm* — Wells St. John P.S.

(57) ABSTRACT

A dual function tree pruner and fruit harvester that uses the same equipment for pruning and for harvesting. The Fruit Tree Pruner and Harvesting Machine features: a Self-Propelled-Vehicle (SPV), computer controlled robotic arms, a Digital Imaging System (DIS), a Radar Ranger System (RRS), Global Positioning Satellite (GPS) Guidance System, Geographic Information System (GIS), a Power Pruner or Power Stem Cutter as appropriate, a fruit vacuum system, a fruit catcher, a fruit handling system, and a fruit bin loader. The operation is automated and the operator monitors and sets parameters. The Fruit Tree Pruner and Harvesting Machine can prune a tree to a predetermined profile. The tree can be shaped per the orchard's requirements. The Fruit Tree Pruner and Harvesting Machine utilizes data obtained during the pruning process to find the fruit, and to remove the fruit while maintaining the fruit quality suitable for the fresh market.

22 Claims, 13 Drawing Sheets

Related U.S. Application Data

13/382,464, filed as application No. PCT/US2010/046678 on Aug. 25, 2010, now Pat. No. 9,226,446, which is a continuation of application No. 12/547,202, filed on Aug. 25, 2009.

(51) Int. Cl.

| | | |
|---|---|---|
| *A01D 46/00* | (2006.01) | |
| *A01B 69/04* | (2006.01) | |
| *A01G 3/08* | (2006.01) | |
| *A01B 79/02* | (2006.01) | |
| *A01G 3/00* | (2006.01) | |
| *G06T 7/00* | (2017.01) | |
| *A01D 34/00* | (2006.01) | |
| *A01D 69/02* | (2006.01) | |
| *A01D 69/03* | (2006.01) | |
| *A01D 101/00* | (2006.01) | |

(52) U.S. Cl.
CPC ........... *A01D 46/005* (2013.01); *A01D 46/24* (2013.01); *A01D 69/02* (2013.01); *A01D 69/03* (2013.01); *A01G 3/00* (2013.01); *A01G 3/08* (2013.01); *G06T 7/0004* (2013.01); *A01D 2101/00* (2013.01); *G06T 2207/30128* (2013.01)

(56) References Cited

U.S. PATENT DOCUMENTS

| | | | |
|---|---|---|---|
| 2,553,463 | A | 5/1951 | McCulloch |
| 3,165,633 | A | 1/1965 | Logan |
| 3,165,880 | A | 1/1965 | Bule |
| 3,182,827 | A | 5/1965 | Frost |
| 3,277,572 | A | 10/1966 | Elckenberg |
| 3,365,870 | A | 1/1968 | Cardinale |
| 3,460,330 | A | 8/1969 | Black |
| 3,507,107 | A | 4/1970 | Harms |
| 3,564,826 | A | 2/1971 | Middleton, Jr. |
| 3,591,949 | A | 7/1971 | Connery |
| 3,621,643 | A | 11/1971 | Garrans |
| 3,756,001 | A | 9/1973 | Macidull |
| 3,793,814 | A | 2/1974 | Rohrbach |
| 3,898,785 | A | 8/1975 | Chew |
| 3,901,005 | A | 8/1975 | Rohrbach |
| 3,913,307 | A * | 10/1975 | Cardinal, Jr. ........ A01D 46/005 15/340.1 |
| 3,969,878 | A * | 7/1976 | Morganeier ......... A01D 46/005 56/328.1 |
| 4,015,366 | A | 4/1977 | Hall |
| 4,215,451 | A | 8/1980 | Wikoff |
| 4,482,960 | A | 11/1984 | Pryor |
| 4,501,113 | A | 2/1985 | Gerber |
| 4,519,193 | A | 5/1985 | Yoshida |
| 4,520,619 | A | 6/1985 | Doi |
| 4,532,757 | A | 8/1985 | Tutle |
| 4,606,179 | A | 8/1986 | Peterson |
| 4,663,925 | A | 5/1987 | Terada |
| 4,718,223 | A | 1/1988 | Suzuki |
| 4,769,700 | A | 9/1988 | Pryor |
| 4,860,529 | A | 8/1989 | Peterson |
| 4,975,016 | A | 12/1990 | Pellenc |
| 4,976,094 | A | 12/1990 | Williamson |
| 5,005,347 | A | 4/1991 | Kedem |
| 5,280,697 | A | 1/1994 | Miller |
| 5,426,927 | A | 6/1995 | Wang |
| 5,471,827 | A | 12/1995 | Janssen |
| 5,816,037 | A | 10/1998 | Chiel |
| 5,946,896 | A | 9/1999 | Daniels |
| 6,250,056 | B1 | 6/2001 | Spagnolo |
| 6,442,920 | B1 | 9/2002 | Peterson |
| 6,553,299 | B1 | 4/2003 | Keller |
| 6,591,591 | B2 | 7/2003 | Coers |
| 6,671,582 | B1 | 12/2003 | Hanley |
| 7,204,072 | B2 | 4/2007 | Joy |
| 7,418,985 | B2 | 9/2008 | Torgersen |
| 7,487,809 | B2 | 2/2009 | Uebergang |
| 7,500,343 | B2 | 3/2009 | Hsia |
| 7,540,137 | B2 | 6/2009 | Gray |
| 7,640,091 | B2 | 12/2009 | Berg |
| 7,765,780 | B2 | 8/2010 | Koselka |
| 7,810,305 | B2 | 10/2010 | Macidull |
| 8,381,501 | B2 | 2/2013 | Koselka et al. |
| 8,442,304 | B2 | 5/2013 | Marrion et al. |
| 2005/0039431 | A1 | 2/2005 | Schloesser |
| 2005/0126144 | A1 * | 6/2005 | Koselka ................ A01D 46/30 56/10.2 R |
| 2006/0026940 | A1 | 2/2006 | Cartner |
| 2006/0150602 | A1 | 7/2006 | Stimmann |
| 2006/0213167 | A1 | 9/2006 | Koselka |
| 2008/0010961 | A1 * | 1/2008 | Gray .................... A01D 46/30 56/10.2 A |
| 2008/0264030 | A1 | 10/2008 | Bryan |
| 2008/0279460 | A1 * | 11/2008 | Kasahara ........... G06K 9/00664 382/224 |
| 2010/0212279 | A1 | 8/2010 | Macidull |
| 2011/0022231 | A1 | 1/2011 | Walker |
| 2014/0283495 | A1 | 9/2014 | Christensen |

* cited by examiner

AGRICULTURE VEHICLES

CROSS REFERENCE TO RELATED APPLICATION

This application is a divisional of U.S. patent application Ser. No. 14/966,704, which was filed on Dec. 11, 2015, which is a divisional of U.S. patent application Ser. No. 13/382,464, which was filed on Jan. 5, 2012, and issued as U.S. Pat. No. 9,226,446 on Jan. 5, 2016, which is a 35 U.S.C. § 371 application of and claims priority to International Application No. PCT/US2010/046678, which was filed on Aug. 25, 2010 and published as Publication No. WO 2011/031490 A2, which claims priority to U.S. patent application Ser. No. 12/547,202, which was filed on Aug. 25, 2009, the entirety of all applications are incorporated herein by reference.

TECHNICAL FIELD

This invention relates to methods and apparatus for pruning of fruit bearing trees such as apples, pears, peaches, plums, apricots, cherries, avocadoes and citrus. And also, this invention relates to methods and apparatus for harvesting of fruit from fruit bearing trees such as apples, pears, peaches, plums, apricots, cherries, avocadoes and citrus.

BACKGROUND OF THE INVENTION

A number of approaches have been taken to develop a mechanical tree pruner and tree topper. These systems mechanically chop or cut branches from the trees. Most of the systems also require hand pruning to prune the tree to it final configuration. The pruning and harvesting systems are not combined, but trellis systems have been utilized to make the manual pruning and manual harvesting more efficient. There are a number of mechanical pruning apparatus that use rotating cutter blades. An example is Rotary Blade Pruning Machine U.S. Pat. No. 6,250,056 B1 and references sited that prune or top the tree along a straight profile. The is no current pruning machine that can cut selected limbs and branches individually and collect an store the data of the pruned profile of the tree to be utilized to locate the fruit during harvesting.

Different approaches have been taken in recent years to develop harvesting machines that will quickly and efficiently remove fruit from trees in a condition that the fruit is suitable for market. Some success has been accomplished for very durable fruits and nuts, but unfortunately no approach has been successful for premium fruits grown for our commercial markets and our fresh markets. Examples of these are apples, pears, peaches, plums, apricots, cherries and citrus.

Shakers have been used with various catching apparatus to shake the tree trunk and catch the fruit that is dislodged. This has not been successful for premium commercial fruits, due to fruit bruising and damage from striking branches and limbs on the way down to the catch mechanism. There are a number of approaches to this effort including (Peterson, D., U.S. Pat. No. 4,606,179; Chiel and Zehavi, U.S. Pat. No. 5,816,037; Peterson and Kornecki, U.S. Pat. No. 4,860,529; Daniels, U.S. Pat. No. 5,946,896).

Another approach utilizes a branch or limb impactor to shake the individual limbs and catch the fruit on a soft conveyor. An example of this approach is shown in Peterson, D. L. and Wolford S. D., U.S. Pat. No. 6,442,920 B1. Robotic Fruit Harvester, U.S. Pat. No. 4,532,757 use a commercial robot arm. Another Self Propelled Robotic Fresh Fruit Picker is shown in George Gray, U.S. Pat. No. 7,540,137 B2 which uses curved rigid tubes that are rotated to access the fruit and then convey the fruit down the tube. Louis L. Bernheim, George M Harris, U.S. Pat. No. 2,968,907 uses a pneumatic fruit gripper and straight tube to guide the fruit out of the tree, but it is a manual application and uses gravity to transfer the fruit. There has been limited success in some applications with some of the harvesters, but currently there is no commercial harvester being utilized for the fresh market fruits, There is no dual purpose pruner and harvester developed for the tree fruit production.

DETAILED DESCRIPTION OF THE PREFERRED EMBODIMENTS

Figure 1:
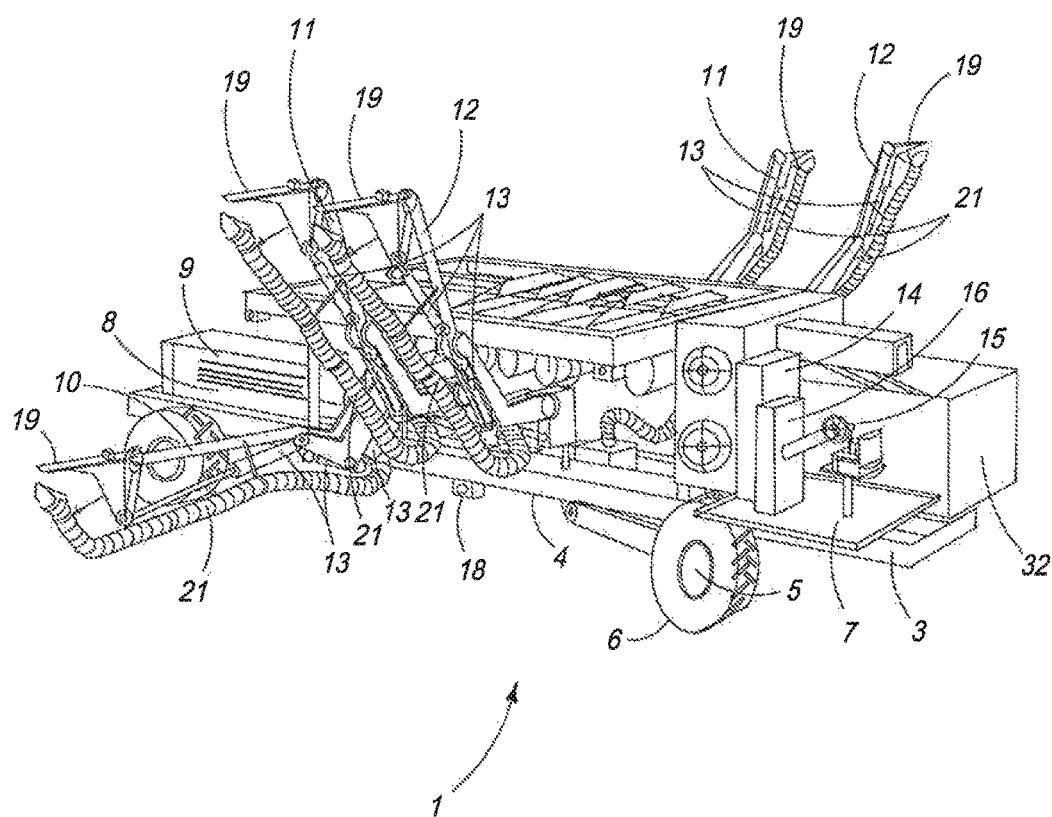
FIG. 1 is a perspective view of the pruner and harvester configured for harvesting.

The methods of the invention allow for individual removal of fruit that will meet the standards for the commercial fresh-market fruit requirements and will not require the fruit to be handled or removed by human hands. The harvesting process is automated and only requires the oversight and interactive control adjustments to the harvesting system.

This invention also relates to methods and apparatus for pruning of grape vines, and the harvesting of grapes that will meet the standards for the commercial fresh market fruit requirements.

The pruning and harvesting of tree fruits for the premium fruit market has been a labor intensive process utilizing hand picking and careful handling of fruits. The proper pruning of the tree determines the access and location of the fruit that is harvested and are closely related. This pruner and harvester takes into consideration of the relationship between pruning and the position of fruit on a limb. Also many fruit trees are pruned during the winter season when the trees are free of leaves and allow the trunks and major branches of the tree to be determined as to their location in three-dimensional space. The fruit is located along these major branches and depending on the fruit, the location can be determined within inches. A graphical image of the tree is stored in a geographic information system identified by its global location. The harvester is mounted on a low motorized Self Propelled Vehicle (SPV) that moves between the tree rows. The SPA will have the appropriated number of robotic arms on each side. The harvester will harvest the fruit by cutting the fruit stem and the fruit will be removed by a vacuum hose that will handle the fruit without bruising or bumping the fruit against each other or against the branches of the trees. The fruit will be removed from the half of the tree nearest the fruit harvester. The fruit will be sorted and packaged to prevent further damage. The harvester will be driven between the rows of fruit trees during harvesting.

The present invention relates to both tree pruning and fruit harvesting in that the functions are closely related in determining the location of the fruit on the tree.

For the pruning operation the pruner and harvester utilizes the Self Propelled Vehicle (SPV), the robotic arms, Global Positioning System (GPS) and Digital Imaging Systems (DIS). It also uses a heavier duty branch power cutter mounted on the end effecter of the robotic arm. Each tree will be located by its GPS location, imaged from the machine and the machine will then prune the tree based on software pruning algorithms. The pruning algorithms will allow the trunk, a selected number of major branches, and a selected number of fruit bearing limbs to remain as part of the tree. The remainder will be pruned from the tree. There are on the order of ten to fifteen major branches in most commercial fruit bearing trees today. The limbs will be pruned to allow the desired fruit spacing based on the fruit buds at the time of pruning. The tree will be pruned from the bottom up. The pruner will cut up the limbs until they fall to the ground. Once the tree is pruned the digital image of the tree is obtained and stored in a Geographic Information System (GIS) including the GPS global location as the identifier of the tree, and the GPS location of the machine. This will be key information that will be utilized by the harvester during the harvesting phase.

For the fruit harvesting operation the pruner and harvester utilizes the SPV, the robotic arms, GPS, GIS, and DIS that are utilized during the pruning operation. During fruit harvesting the pruner and harvester also uses a power stem cutter, a fruit catcher, a vacuum hose mounted on the end effectors of the robotic arm, a fruit collector system, and a Radar Ranging System (RRS) to help locate the trunk and major branches. The location of the fruit and the order of picking will be predetermined based on the barren tree image at pruning that is stored in the GIS data base. Between pruning and harvesting, the picking algorithms for each tree will be generated utilizing a computer program that will build a 3-D stick image of each fruit tree. A 3-D profile for the tree half facing the harvester is generated, and picking algorithms are generated that will move the end effecter along the limbs and branches and utilize the imaging system on the end effecter to home in on the fruit to cut the stems. The fruit catcher will be held just under the fruit and when the fruit stem is cut the fruit will drop a very short distance and directed into the vacuum hose that will suck the fruit into the fruit collector. The fruit collector will catch the fruit and convey each piece of fruit to the fruit handling system, which will pack the fruit in fruit bins or fruit trays that will be placed on pallets.

Figure 2:
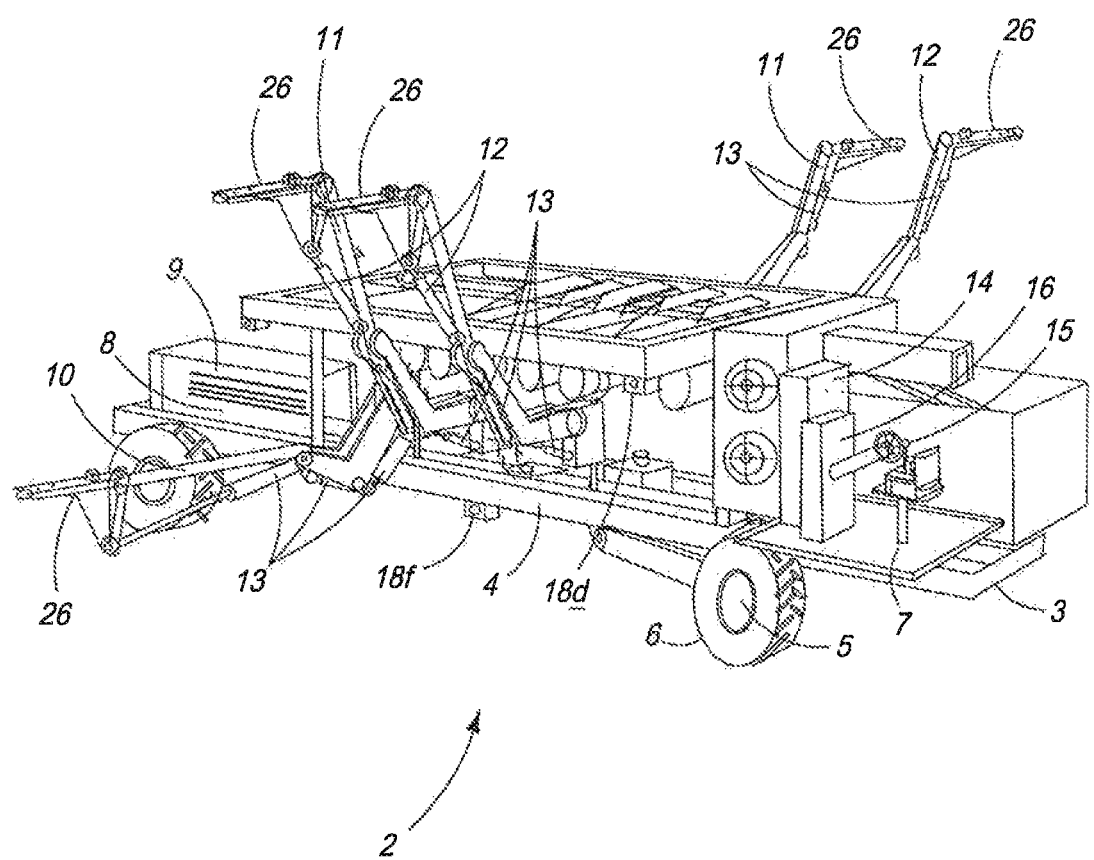
FIG. 2 is a perspective view of the pruner and harvester configured for pruning.
Figure 3:
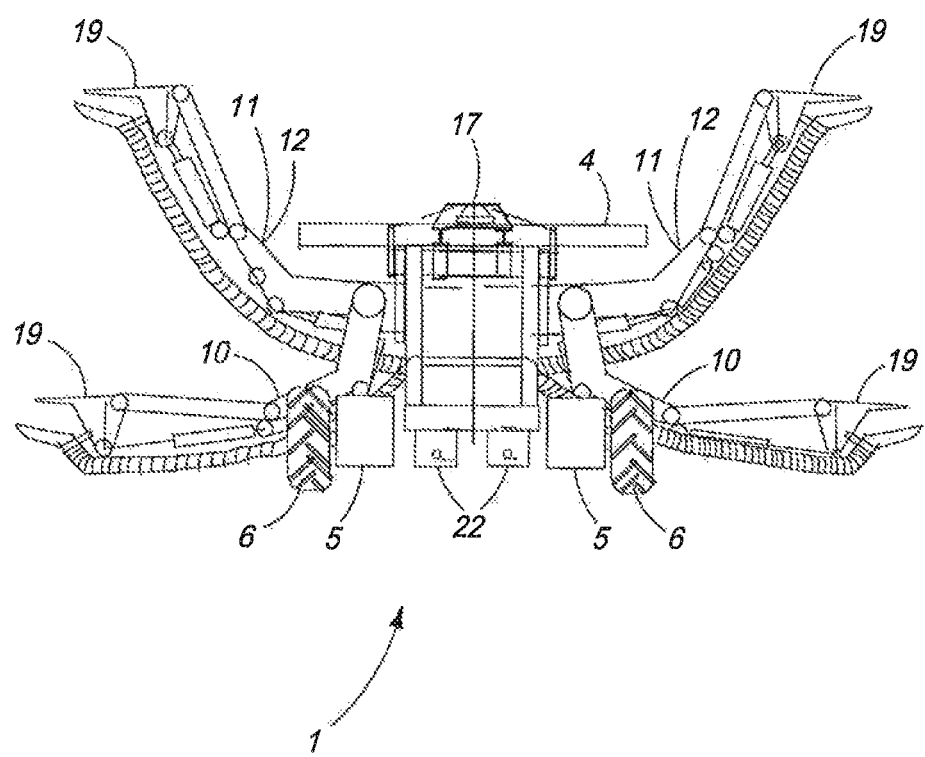
FIG. 3 is a front view of the pruner and harvester.

The present invention relates to fruit harvesting generally as configured in the FIG. 1 indicated as 1 and relates to tree pruning generally and configured in FIG. 2 indicated as 2. The fruit pruner and harvester machine is propelled through the orchard on a Self-Propelled Vehicle (SPV) is generally indicated as 3. The SPV consists of a structural frame 4, hydrostatic drives 5, low profile wheels 6, operator platform 7, motor and hydrostatic transmission 8, and electrical generator 9. These items are generally commercially available. The SPV can be provided with self-leveling options that will keep the frame level for orchards on hill sides. The robotic arms are shown in FIG. 1 through FIG. 5 and are indicated as forward arm 10, middle arm 11, and rear arm 12. There are six robotic arms two each of 10, 11, and 12 shown in these figures, but the number of arms may be varied depending on the type of fruit and picking rate desired. The arms are powered by hydraulic cylinders 13 and Computer Based Control System (CBCS) indicated as 14. The hydraulics can also be switched to manual and operated by the operator utilizing the joystick 15.

Figure 4:
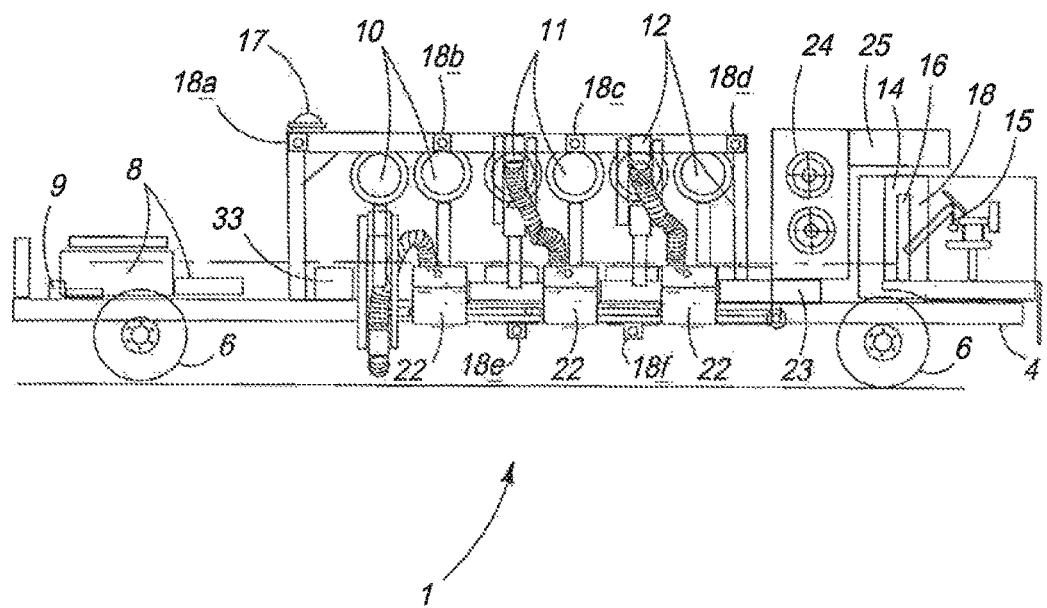
FIG. 4 is a side view of the pruner and harvester.

The Global Positioning System Guidance System (GPS) is indicated as 16 (FIG. 4) with the GPS antenna 17 (FIG. 4) mounted on top of the SPV frame to get a clear view of the sky. The GPS Guidance System locates the SPV at all times and drives the SPV on a centerline between the two tree rows, and provides a reference for referencing all the data received from the Digital Imaging Systems (DIS) 18 (FIG. 4); Radar Ranging System (RRS) 18d,f (FIG. 4); and the CBCS 14 (FIG. 4).

A DIS cameras, indicated as 18a,b,c,d, (FIG. 5) provide dual images of the tree and references the images to their GPS location.

The RRS is indicated as 18e, f, (FIG. 4) measures the distance to the tree trunks, and major branches, and then the distance is referenced to the GPS location of the SPV.

All of these sensing systems are utilized in the tree pruning process and the fruit harvesting process. There are two duplicate systems one on the right side and one on the left side of the SPV that are mirror-imaged and each system operates independent of the other system. The speed of the machine is controlled by the operator.

The tree pruning process is described in detail with the machine setup in the pruning configuration as shown in FIG. 2. The SPV 3 is fitted with the larger Power Pruning Assembly 26 on the robotic arms 10, 11, and 12. The fruit catcher 20 and fruit vacuum hoses 21 are removed.

The operator uses the GPS 16 to align the machine to the center of two tree rows, or in the case of an edge row one sets the distance of the machine from the tree row. The operator initializes each of the robotic arms 10, 11, 12 to the start pruning position. The operator will then locate the first tree trunk on each side of the SPV 3 by guiding the most forward right robotic arm 10 until the end effecter just touches the trunk of the first tree. The operator will do this task by operating the joystick 15. Then the operator will locate the second tree on the left side of the SPV 3 by guiding the most forward robotic arm 10 until the end effecter just touches the trunk of the second tree. Note: the left side robotic arms are staggered ahead of the right side robotic arms on the machine. Once the machine is aligned and initialized the operator the checks that all interlocks are good and selects the auto-pruning operation.

Figure 5:
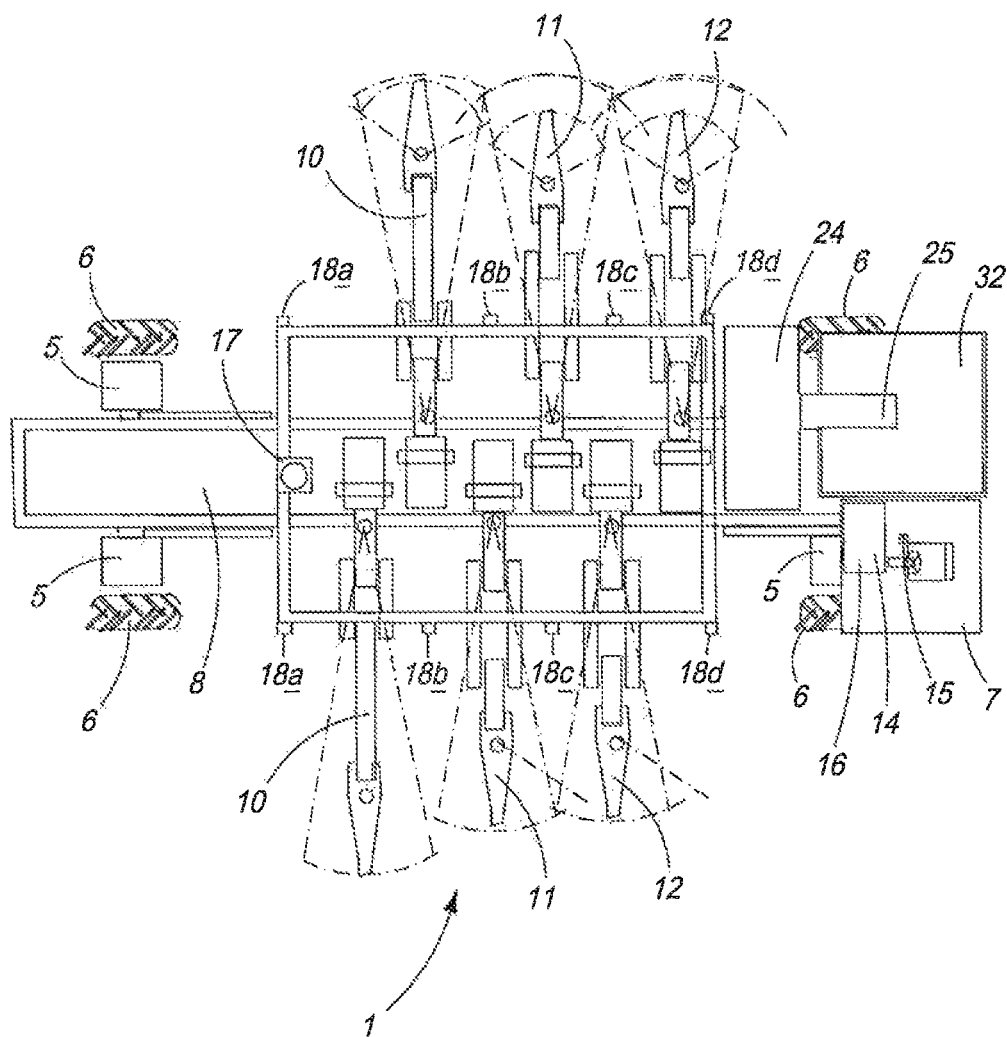
FIG. 5 is a top view of the pruner and harvester.
Figure 18:
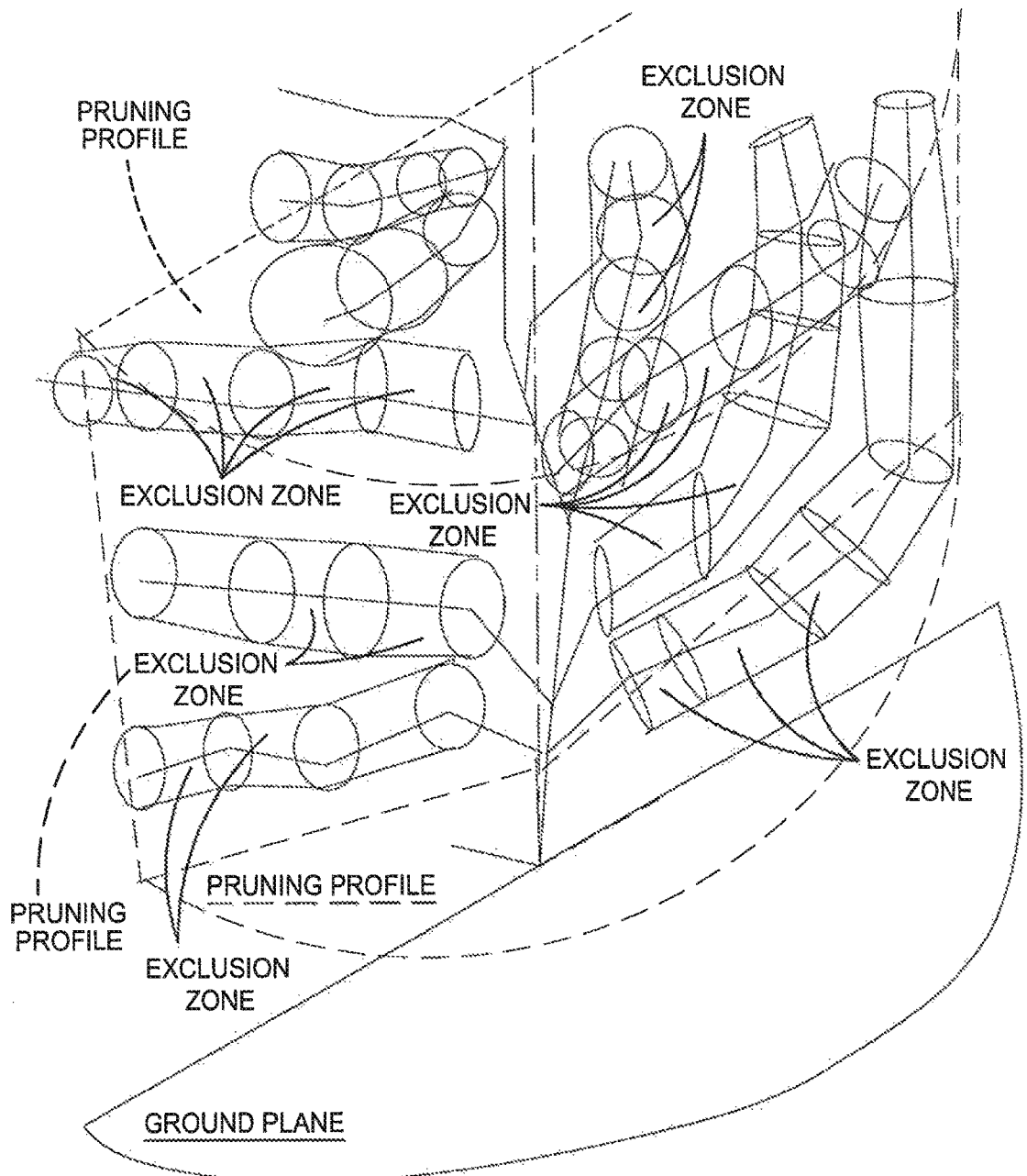
FIG. 18 is a depiction of the 3-D stick image of ½ of the fruit tree.

The CBCS 14 FIG. 2 will start pruning algorithms with the selection of an auto-pruning operation. The front robotic arms 10 will first make several passes using the Power Pruner Assembly 26 FIG. 2 to clear all limbs below the lower profile set for the trees. The DIS cameras 18a,b,c,d (FIG. 5) will process a number of dual digital images of the tree, and the superimposition of these images starting at the trunk will provide the data to develop a vector-based-stick-image of the tree trunk, limbs, and branches. The vector-based-image is represented by the image provided in FIG. 18. The CBCS 14 (FIG. 5) will be assigned a profile algorithm that will consist of about one-third of the tree to each robotic arm. The front robotic arm 10 will be assigned a profile for the lower one-third of the tree, the middle robotic arm 11 will be assigned a profile for the middle one-third of the tree, and the rear robotic arm 12 will be assigned a profile for the top one-third of the tree, and the top profile. The DIS 18 will be imaging the tree as it is pruned with the DIS cameras 18*a,b,c,d* (FIG. 5). The tubular paths around the stick images of the tree branches represent the exclusion areas for the pruning profiles for the half of the tree being pruned depicted in FIG. 18. When the rear robotic arm 12 completes its pruning profile, the rear DIS camera 18*e* will store and identify the final pruning image. This image data is stored in the GIS database so the data can be retrieved based on the location of the tree. The process is continued to the next tree in the row when the front robotic arm 10 completes running the profile assigned to it, and continues by pruning all limbs below the lower profile set for the trees. The process repeats itself for the next tree in each row as described above.

The fruit harvesting process is described in detail with the machine setup in the fruit harvesting configuration as shown in FIG. 1. The SPV 3 is fitted with the smaller Stem Cutting Assembly 19 on the robotic arms 10, 11, and 12. The fruit catcher 20 (FIG. 7) and fruit vacuum hoses 21 (FIG. 7) will also be installed. The fruit vacuum hose will be attached to the fruit collector 22 (FIG. 4). The air flow for the vacuum is provided by the blower 32 (FIG. 4) which creates a vacuum over the water in the fruit collectors 22 (FIG. 4).

The time between the pruning and harvesting is utilized to process the pruned tree images; generate a vector stick image of the tree trunk, major branches, and limbs; and generate an algorithm for locating the fruit in the tree based on the knowledge that the fruit sets on buds from the previous year. The computation time for generating the Pick Path Algorithm for the robotic arms 10, 11, 12 will not impact the harvesting speed since it can be completed between pruning time and harvest time. The algorithm will consist of a specific pick path for each robot arm 10, 11, 12, respectively, with the stem cutter assembly 19 (FIG. 1) attached. The Pick Path Algorithm will be generated and stored in the GIS data base and will be downloaded to the harvester for each tree in the orchard at the time it is harvested. Each tree will be identified by the GPS location of the tree trunk.

The operator will use the GPS 16 (FIG. 1) to align the machine to the center line of two tree rows, in the case of an edge row set the distance of the machine from the tree row based on the stored coordinates that were collected during the pruning process above. The operator will then initialize each of the robotic arms 10, 11, 12 to the start harvesting position. The operator will do this task by operating the joy stick 15 (FIG. 1). Once the machine is aligned and initialized, the operator checks that all interlocks are good and selects the auto-harvesting operation.

The CBCS 14 (FIG. 1) will start harvesting algorithms with the selection of auto-harvesting operation. The front robotic arm 10 will in general harvest the lower limbs of the tree, the middle arm 11 will harvest the middle limbs of the tree, and the back robotic arm 12 will harvest the top limbs of the tree.

Figure 9:
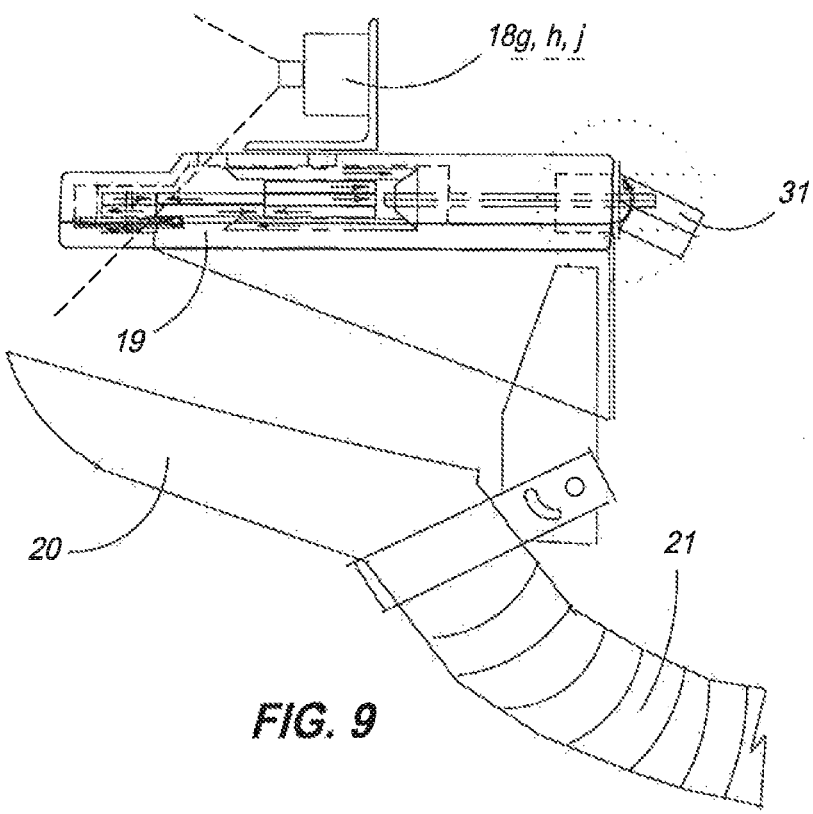
FIG. 9 is a detailed side view of the stem cutter and fruit catcher end effecter.
Figure 12:
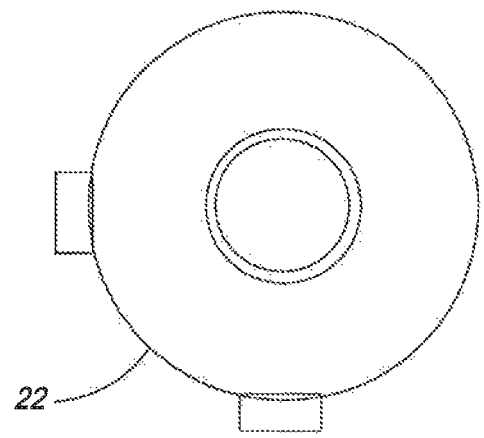
FIG. 12 is a top view of the fruit collector.
Figure 13:
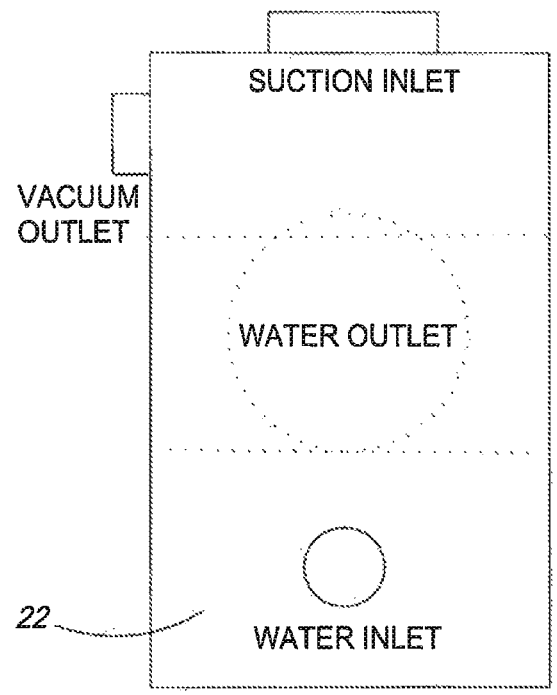
FIG. 13 is a side view of the fruit collector.

Once the stem cutter 19 (FIG. 1, FIG. 9) is positioned to the Pick Path Algorithm location, then a second algorithm is run that finds the closest fruit and cuts the stems using the DIS camera 18*g,h,j* (FIG. 9) mounted on the stem cutter assembly 19 (FIG. 9). When the DIS 18 (FIG. 4) detects the fruit the stem is cut the second algorithm turns control back to the Pick Path Algorithm. When the stem of the fruit is cut, the fruit falls a short distance to the fruit catcher 20 (FIG. 9), the air flowing in the vacuum hose 21 (FIG. 9), and moves the fruit individually to the fruit collector 22 (FIG. 4). The set of algorithms continue until the assigned pick path is completed for the robotic arm assigned to a tree. The arm then initializes on the trunk of the next tree to be harvested and the process repeats itself.

The fruit collector 22 (FIG. 4) absorbs the energy of the fruit moving through the vacuum hoses 21 (FIG. 1) by dropping the fruit into flowing water. The fruit handling system 23 (FIG. 4) uses water to wash the fruit and move the fruit to the elevator 24 (FIG. 4). As the fruit moves up the elevator 24 (FIG. 4) air is blown over the fruit to dry the surface water on the fruit. The elevator raises the fruit up to the bin loader 25 (FIG. 5) that gently places the fruit into the fruit bin 32 (FIG. 5) or trays.

Figure 11:
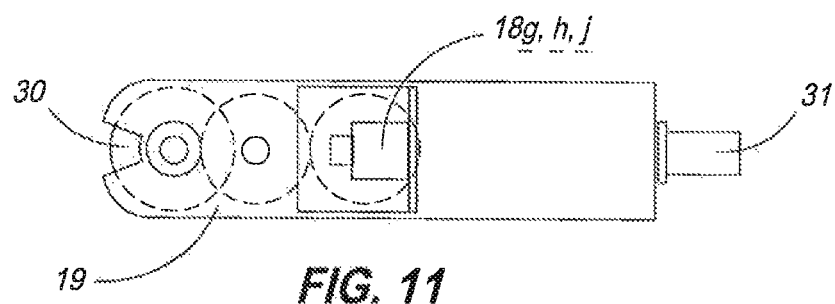
FIG. 11 is a detailed top view of the stem cutter.
Figure 10:
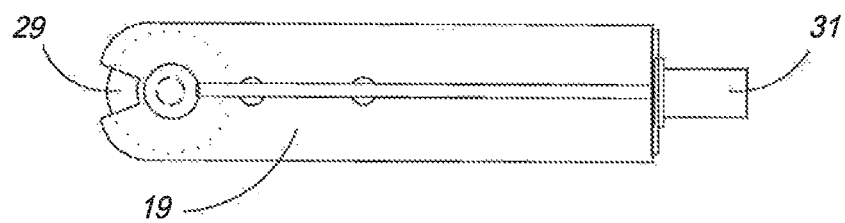
FIG. 10 is a detailed bottom view of the stem cutter.
Figure 14:
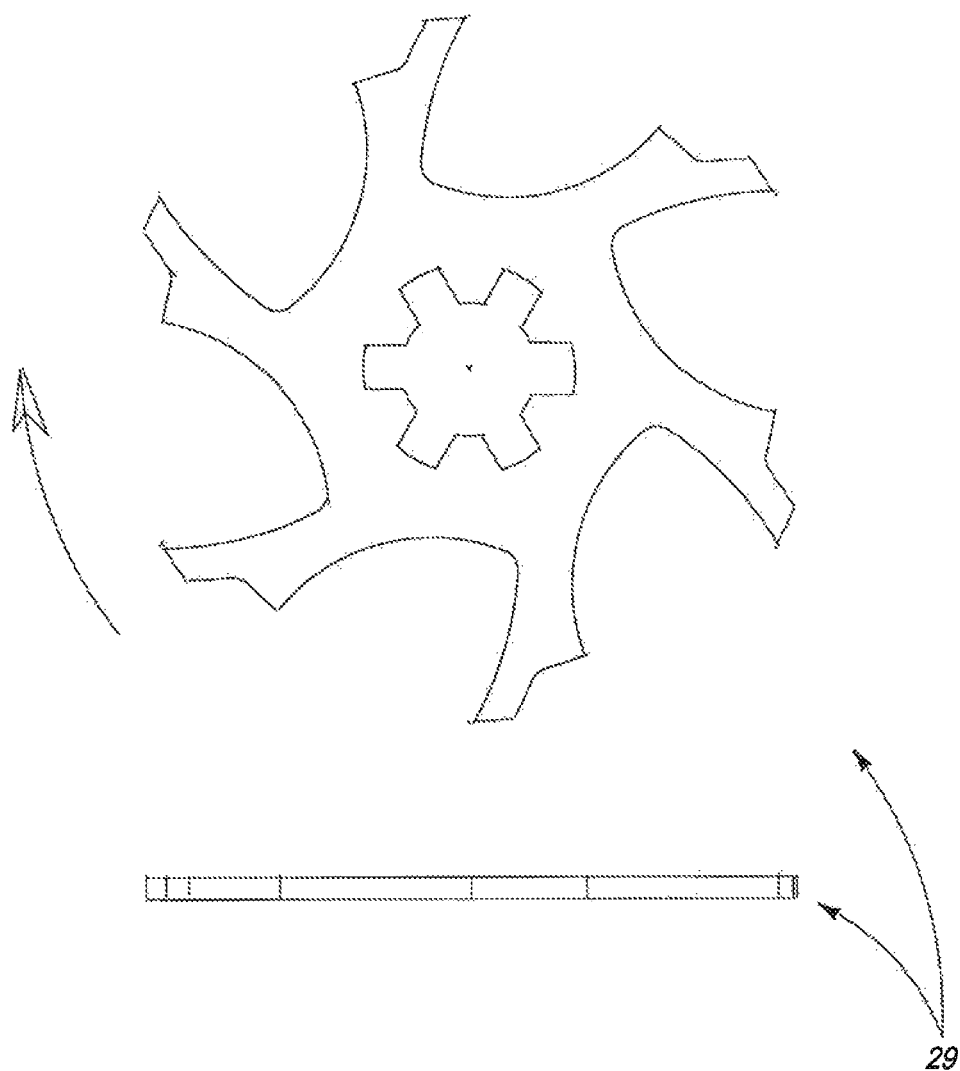
FIG. 14 is a detail view of the Stem Cutter Shear Blade.
Figure 15:
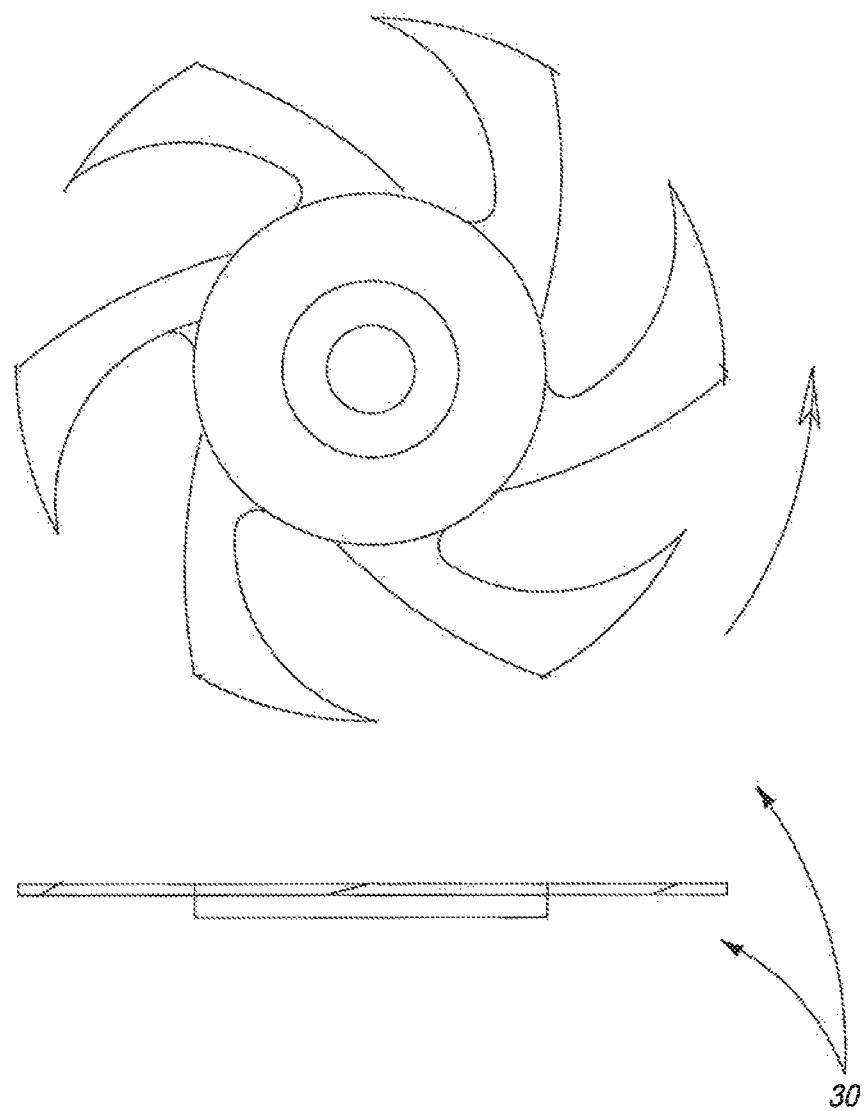
FIG. 15 is a detail view of the Stem Cutter Knife blade.

The Stem Cutter 19 and Fruit Catcher 20 are detailed in FIG. 9, FIG. 10, and FIG. 11, and utilize synchronized counter-rotating Stem Cutter Shear Blade 29 (FIG. 14) and Stem Cutter Knife Blade 30 (FIG. 15). The blades are powered by a hydraulic motor 31 (FIG. 9). The fruit stem is captured between the counter-rotating cutter knife and the shear blade to provide for a clean cut and does not transfer energy to the fruit that could result in bruising. The stem cutter is shaped so that the fruit cannot be inserted into the cutting blades of the stem cutter.

Figure 8:
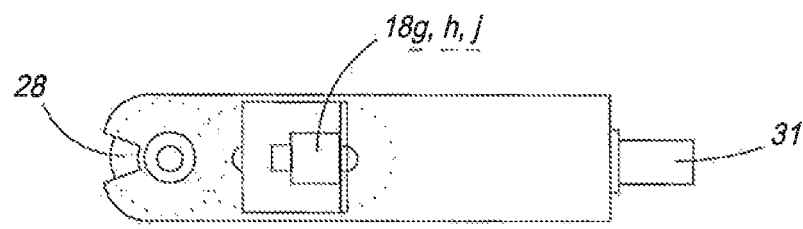
FIG. 8 is a detailed top view of the tree pruner end effecter.
Figure 7:
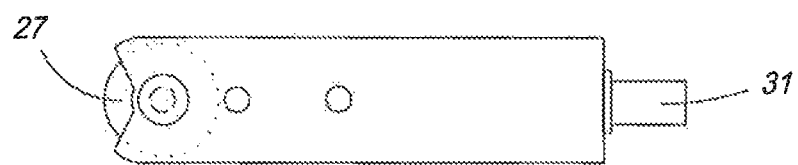
FIG. 7 is a detailed bottom view of the tree pruner end effecter.
Figure 6:
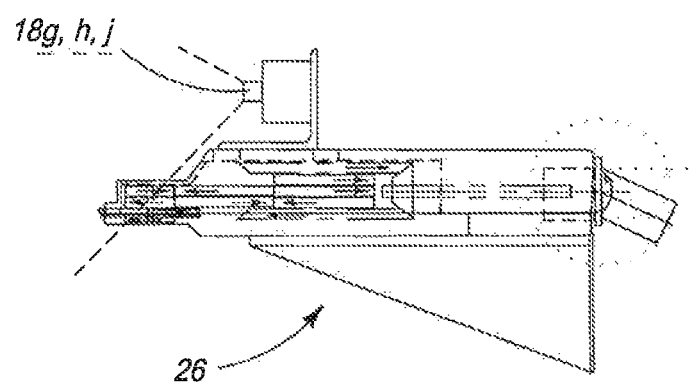
FIG. 6 is a detailed side view of the tree pruner end effecter.
Figure 16:
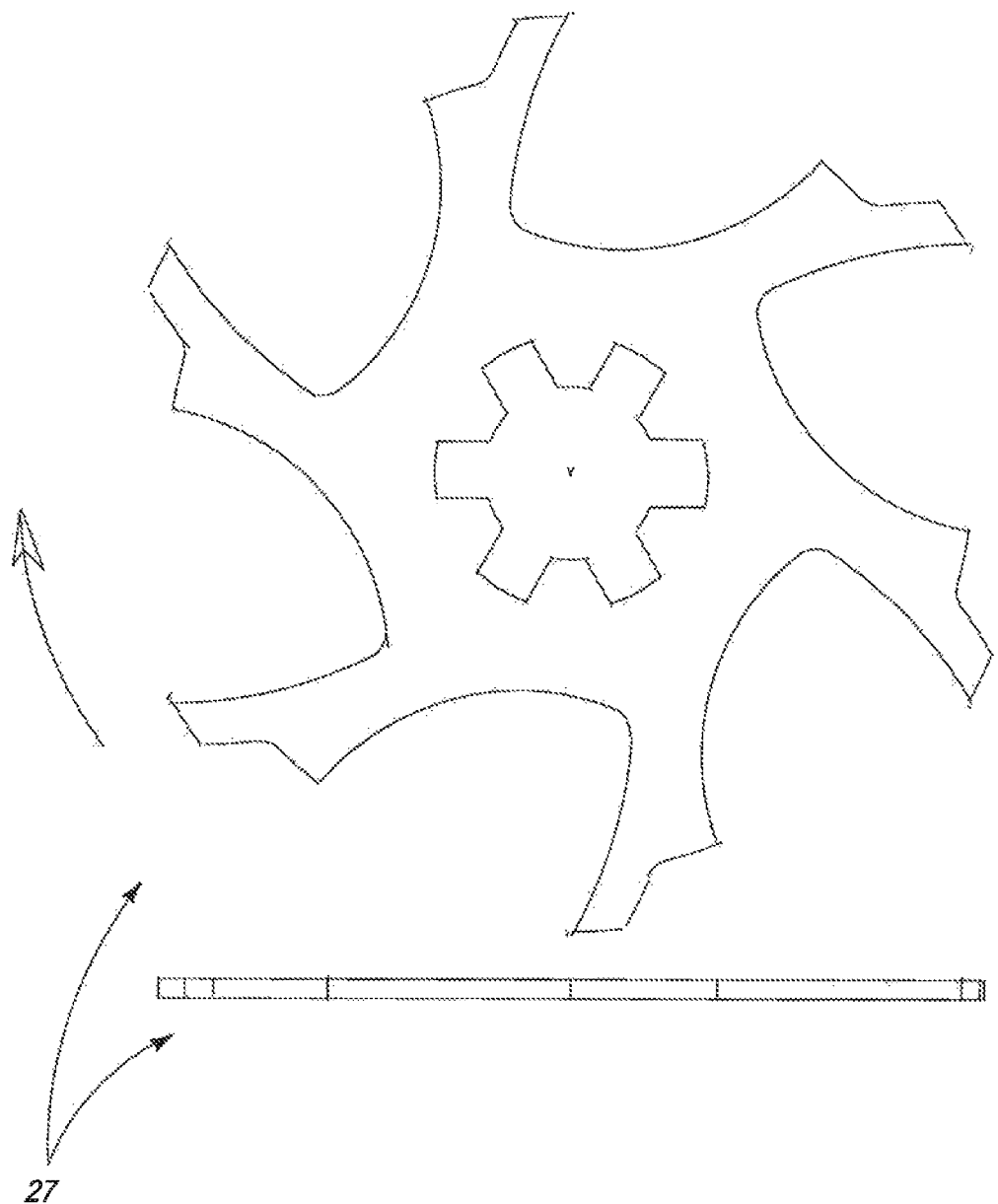
FIG. 16 is a detail view of the Pruning Shear Blade.
Figure 17:
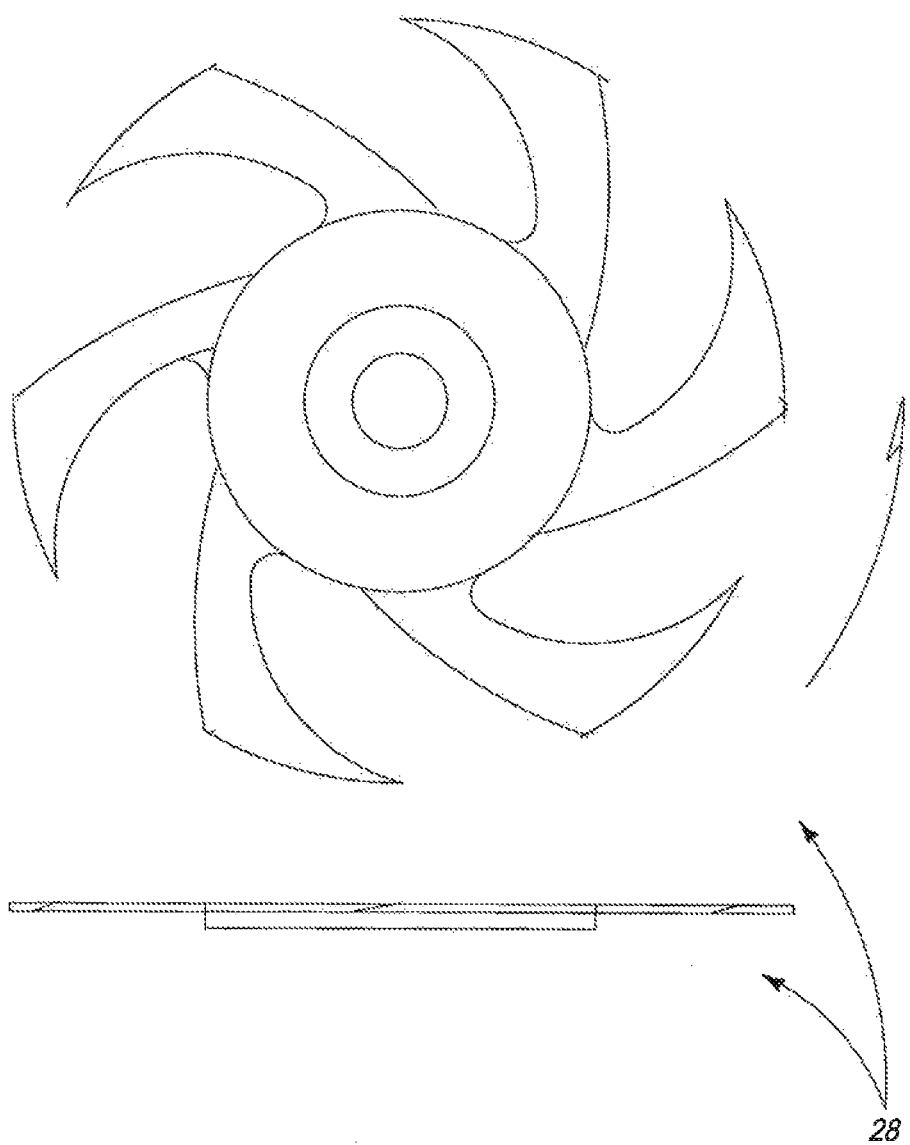
FIG. 17 is a detail view of the Pruner Knife Blade.

The Power Pruner Assembly 26 is detailed in FIG. 6, FIG. 7, and FIG. 8, and also utilizes synchronized counter-rotating Pruning Shear Blade 27 (FIG. 16) and Pruning Knife Blade 28 (FIG. 17). The blades are powered by a hydraulic motor 31 (FIG. 6). The pruner operates in the same manner as the stem cutter, except the size is scaled up to cleanly cut the larger limbs.

1. A pruning apparatus for pruning fruit trees that are grown in rows, and may be free standing or grown on trellises. The mechanical pruner travels between the rows of trees and can prune each tree half facing the SPV to a 3-D profile that is desired for the best growth of fruit desired by the growers. The pruner can prune trees on the right and left side of the machine as well as only on the right or left side. The pruner can remove cross branches, and branches on the order of one-half inches in diameter to two inches in diameter. The pruner works best when the trees are dormant and without leaves, but may also be used for trees such as avocadoes and citrus with the addition of radar tagging of the major limbs and branches. The brush removed is allowed to drop to the ground to be removed with current brush cleanup equipment. The SPV is outfitted with the Power Pruner Assemblies sized for the type of growth.

2. A pruning machine apparatus for pruning grapes, fruit bearing bushes and other crops that are grown in rows and the pruning configuration can be defined in a 3-D profile. A different SPV will be required to adjust for the difference in row heights and widths for these types of crops then is depicted as 3 (FIG. 2). The pruner can remove cross branches, and branches on the order of one-quarter inches in diameter to two inches in diameter. The pruner works best when the grapes are dormant and with-out leaves. The brush removed is allowed to drop to the ground to be removed with current brush cleanup equipment.

3. A fruit harvesting apparatus for harvesting fruit from trees grown in rows, and may be free standing or grown on trellises. The mechanical harvester travels between the rows of trees and can harvest the fruit from each tree half facing the SPV on the right side and left side of the harvesting SPV, as will as just on the right side or the left side as desired by the operator. The fruit is harvested by a stem cutter that cuts the stem of the fruit and allows the fruit to drop a very short distance into a fruit catcher that directs the fruit to the vacuum hose that conveys the fruit individually to the fruit collector. The fruit collector catches the fruit in flowing water and quickly moves the fruit out of the way of the next fruit that comes through the fruit vacuum system. The fruit is not bruised or damaged by contacting other fruit. The vacuum hose protects the fruit from hitting limbs and branches that also can damage the fruit. The result is a high quality premium fruit that is desirable for the fresh-fruit market.

4. A grape harvesting apparatus for harvesting grapes that are on trellises or other berry or fruit bearing bushes that are planted in rows held up right by trellises. A different SPV will be required to adjust for the difference in row heights and widths for these types of crops then is depicted as 3 (FIG. 1). The grape clusters are harvested by a stem cutter that cuts the stem of the grape cluster and allows the grapes to drop a very short distance into a fruit catcher that directs the fruit to the vacuum hose that conveys the fruit individually to the fruit collector. The fruit collector catches the fruit in flowing water and quickly moves the fruit out of the way of the next fruit that comes through the fruit vacuum system. The grapes are not bruised or damaged by contacting other fruit clusters. The vacuum hose protects the grapes from hitting limbs and branches that also can damage the grapes. The result is a premium quality grape that is desirable for the fresh-fruit market.

5. The pruner and harvester as set forth in claims 1, 2, 3, and 4, requires a single operator, to operate the machine. The machine is self guided using a GPS Guidance Systems. This frees the operator to better monitor the mechanical pruning or harvesting processes that operate in an automatic mode. The operation is automatic but the operator can interactively interface with the CBCS 14 (FIG. 1) for the right and left side robotic arms to adjust and set the processing parameters.

6. The pruner and harvester as set forth in claims 3 and 4 provides a fruit catcher 20 (FIG. 8) that collects the fruit after a fall of a few inches and is directed into the vacuum hose by the air flow.

7. The pruner and harvester as set forth in claims 3 and 4 provides for a vacuum blower 28 (FIG. 4) which creates a vacuum above the water surface in the fruit collector to provide the air flow that moves the fruit through the vacuum hose 22 (FIG. 4) from the tree to the fruit collector 21 (FIG. 4).

8. The pruner and harvester as set forth in claims 3 and 4 provides for a fruit collector 22 (FIG. 8), that slows the fruit passing through the vacuum hose and delivers the fruit to the fruit handler 9. The pruner and harvester as set forth in claims 3 and 4 provides for a fruit stem cutter 19 (FIG. 7), that utilizes two synchronized counter-rotating cutter shear blade 29 and stem cutter knife 30 to cut the stems of the fruit, without inputting kinetic energy into the fruit, so the fruit drops straight down into the fruit catcher 20.

10. The pruner and harvester as set forth in claim 1, and 2 provides for a Power Pruner Assembly 26 (FIG. 6, FIG. 7, FIG. 8), utilizes synchronized counter rotating Pruning Shear Blade 27 and Pruning Knife Blade 28 to make a clean cut to remove limbs and branches without impacting or damaging or splitting the part of the branch or limb left on the tree Harvester glossary
1. Harvester Machine
2. Pruner Machine
3. Self Powered Vehicle (SPV)
4. Structural Frame
5. Hydrostatic Drive
6. Low Profile Wheels
7. Operator Platform
8. Motor & Hydrostatic Transmission
9. Electric Generator
10. Forward Robotic Ann
11. Middle Robotic Ann
12. Rear Robotic Arm
13. Hydraulic Cylinder
14. Compliter Based Control System (CBCS)
15. Manual Joystick
16. Global Positioning Satellite Guidance System (GPS)
17. GPS Antenna
18. Digital Imaging System (DIS)
  a. DIS Camera
  b. DIS Camera
  c. DIS Camera
  d. DIS Camera
  e. DIS Range Camera
  f. DIS Range Camera
  g. DIS Close-up Camera
  h. DIS Close-up Camera
  i. Blank
  j. DIS Close-up Camera
19. Stem Cutter Assembly
20. Fruit Catcher
21. Fruit Vacuum Hose
22. Fruit Collector
23. Fruit handling System
24. Elevator
25. Bin Loader
26. Power Pruner Assembly
27. Pruner Shear Blade
28. Pruner Knife Blade
29. Stem Cutter Shear Blade
30. Stem Cutter Knife Blade
31. Hydraulic Motor
32. Fruit Bin
33. Blower

The invention claimed is:

1. An agricultural vehicle comprising:
   a frame on wheels;
   a vacuum tube supported upon the frame;
   a robotic arm supported upon the frame, the vacuum tube secured to the robotic arm, the robotic arm configured for movement;
   a fruit collector in operative cooperation with the vacuum tube; and
   wherein the fruit collector comprises:
      a suction inlet in fluid communication with a vacuum outlet; and
      a water inlet in fluid communication with a water outlet.

2. The agricultural vehicle of claim 1 further comprising an electric generator supported upon the frame and in operative cooperation with the robotic arm.

3. The agricultural vehicle of claim 1 further comprising a Computer Based Control System (CBCS) supported upon the frame and in operative cooperation with the robotic arm.

4. The agricultural vehicle of claim 1 wherein the robotic arm is powered by hydraulic cylinders.

5. The agricultural vehicle of claim 1 further comprising a camera supported upon the frame and in operative cooperation with the robotic arm.

6. The agricultural vehicle of claim 1 further comprising a blower supported upon the frame and in operative cooperation with the vacuum tube.

7. The agricultural vehicle of claim 1 wherein the vehicle is operated by a single person.

8. The agricultural vehicle of claim 1 further comprising a digital image system (DIS) supported upon the frame and in operative cooperation with the robotic arm.

9. The agricultural vehicle of claim 8 wherein the digital image system comprises at least one of the following devices: a DIS camera, a DIS close-up camera, and a DIS range camera.

10. The agricultural vehicle of claim 1 wherein the robotic arm is a first robotic arm operational from a first side of the frame, and further comprising, a second robotic arm operational from a second side of the frame opposite from the first side, and wherein from a top plan view, the first robotic arm is staggered from the second robotic arm.

11. The agricultural vehicle of claim 1 wherein the robotic arm is a first robotic arm operational from a first side of the frame, and further comprising, a second robotic arm operational from a second side of the frame opposite from the first side, and wherein from a top plan view, the first robotic arm is misaligned from the second robotic arm.

12. The agricultural vehicle of claim 1 wherein the robotic arm is a plurality of first robotic arms operational from a first side of the frame, and further comprising, a plurality of second robotic arms operational from a second side of the frame opposite from the first side, and wherein from a top plan view, at least one of the plurality of the first robotic arms is staggered from at least one of the plurality of the second robotic arms.

13. The agricultural vehicle of claim 1 wherein the robotic arm is a plurality of first robotic arms operational from a first side of the frame, and further comprising, a plurality of second robotic arms operational from a second side of the frame opposite from the first side, and wherein from a top plan view, all of the plurality of the first robotic arms are staggered from at least one of the plurality of the second robotic arms.

14. The agricultural vehicle of claim 1 wherein the robotic arm is a plurality of first robotic arms operational from a first side of the frame, and further comprising, a plurality of second robotic arms operational from a second side of the frame opposite from the first side, and wherein from a top plan view, all of the plurality of the first robotic arms are staggered from all of the plurality of the second robotic arms.

15. The agricultural vehicle of claim 1 further comprising a fruit catcher extending from an end of the vacuum tube.

16. The agricultural vehicle of claim 15 wherein the fruit catcher comprises an elongated cup configuration.

17. The agricultural vehicle of claim 15 further comprising a blade operational at an end of the robotic arm, and wherein the fruit catcher is directly below the blade.

18. An agricultural vehicle comprising:
a frame on wheels;
a vacuum tube supported upon the frame;
a robotic arm supported upon the frame, the vacuum tube secured to the robotic arm, the robotic arm configured for movement; and
wherein the robotic arm is a first robotic arm operational from a first side of the frame, and further comprising, a second robotic arm operational from a second side of the frame opposite from the first side, and wherein from a top plan view, the first robotic arm is staggered from the second robotic arm.

19. An agricultural vehicle comprising:
a frame on wheels;
a vacuum tube supported upon the frame;
a robotic arm supported upon the frame, the vacuum tube secured to the robotic arm, the robotic arm configured for movement; and
wherein the robotic arm is a first robotic arm operational from a first side of the frame, and further comprising, a second robotic arm operational from a second side of the frame opposite from the first side, and wherein from a top plan view, the first robotic arm is misaligned from the second robotic arm.

20. An agricultural vehicle comprising:
a frame on wheels;
a vacuum tube supported upon the frame;
a robotic arm supported upon the frame, the vacuum tube secured to the robotic arm, the robotic arm configured for movement; and
wherein the robotic arm is a plurality of first robotic arms operational from a first side of the frame, and further comprising, a plurality of second robotic arms operational from a second side of the frame opposite from the first side, and wherein from a top plan view, at least one of the plurality of the first robotic arms is staggered from at least one of the plurality of the second robotic arms.

21. An agricultural vehicle comprising:
a frame on wheels;
a vacuum tube supported upon the frame;
a robotic arm supported upon the frame, the vacuum tube secured to the robotic arm, the robotic arm configured for movement; and
wherein the robotic arm is a plurality of first robotic arms operational from a first side of the frame, and further comprising, a plurality of second robotic arms operational from a second side of the frame opposite from the first side, and wherein from a top plan view, all of the plurality of the first robotic arms are staggered from at least one of the plurality of the second robotic arms.

22. An agricultural vehicle comprising:
a frame on wheels;
a vacuum tube supported upon the frame;
a robotic arm supported upon the frame, the vacuum tube secured to the robotic arm, the robotic arm configured for movement; and
wherein the robotic arm is a plurality of first robotic arms operational from a first side of the frame, and further comprising, a plurality of second robotic arms operational from a second side of the frame opposite from the first side, and wherein from a top plan view, all of the plurality of the first robotic arms are staggered from all of the plurality of the second robotic arms.

* * * * *